US012397544B2

(12) United States Patent
Ujiie

(10) Patent No.: US 12,397,544 B2
(45) Date of Patent: Aug. 26, 2025

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventor: Keisuke Ujiie, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 18/325,305

(22) Filed: May 30, 2023

(65) Prior Publication Data

US 2023/0391073 A1 Dec. 7, 2023

(30) Foreign Application Priority Data

Jun. 7, 2022 (JP) ................................ 2022-092338

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .... B41J 2/0451; B41J 2/04586; B41J 2/2142; B41J 2/16579
See application file for complete search history.

(56) References Cited

FOREIGN PATENT DOCUMENTS

EP 2837497 B1 * 10/2019 ............ B41J 2/0458
JP 2004-042285 A 2/2004
JP 2007-076265 A 3/2007
JP 2012-086478 A 5/2012
JP 2012-187917 A 10/2012
JP 5924000 B2 * 5/2016

OTHER PUBLICATIONS

Oct. 23, 2023 European Official Action in European Patent Appln. No. 23176598.3.

* cited by examiner

*Primary Examiner* — Sharon Polk
(74) *Attorney, Agent, or Firm* — Venable LLP

(57) ABSTRACT

An embodiment of the present invention is a printing apparatus including: a print head including a plurality of nozzles each configured to eject a liquid droplet to a print medium; a control unit configured to control drive of each of the nozzles so as to eject the liquid droplet; a sensor configured to detect the liquid droplet ejected from each of the nozzles; a determination unit configured to perform determination as to whether or not stir of the liquid droplet is present in a case where each of the nozzles is driven by the control unit; and an adjustment unit configured to perform adjustment of an ejection interval between the nozzles in a case of detecting the liquid droplet by using the sensor, the adjustment being carried out based on the determination as to whether or not the stir is present.

13 Claims, 11 Drawing Sheets

PRINTING APPARATUS, METHOD OF CONTROLLING PRINTING APPARATUS, AND STORAGE MEDIUM

BACKGROUND

Field

The present disclosure relates to an ink jet printing apparatus, or more specifically, to a technique for detecting a state of ejection of ink droplets to be ejected from a print head.

Description of the Related Art

In an ink jet printing apparatus, it is important to understand a state of ejection of ink droplets to be ejected from each of nozzles of a print head in order to maintain constant quality of a printed image. Adaptation to higher image quality, higher speed, and diversification in loaded inks has been required in recent years. Moreover, reduction in size of ink droplets to be ejected from respective nozzles is in progress. In particular, from the viewpoint of image formation, an ejection speed and an amount of droplets of the ejected ink droplets are set to optimum values for each of ink colors in consideration of a variation among print heads or variations of physical properties among the ink colors. Nonetheless, it is known that a state of ejection of the ejected ink droplets may change depending on a state of use of a printing apparatus or environmental effects thereon. Variations in physical properties of the ejected ink droplets (main droplets as well as satellites being small droplets formed by fragmentation of the main droplets) including ejection speeds (flying speeds), sizes, flying intervals, ejection directions, and the like have also been ascertained. Accordingly, it is desirable to detect the state of ejection of the ejected ink droplets before using the printing apparatus so as to determine whether or not the ink droplets are successfully ejected or whether or not the ejection speeds and other factors are normal even in the case of the successful ejection.

In the course of detecting a state of ejection of liquid droplets such as the ink droplets, there may be a case where the liquid droplets are stirred up due to a variation or turbulence of a surrounding airflow. In this case, detection accuracy is significantly deteriorated in the state where the stirred liquid droplets stay in the vicinity of a detection element. In this regard, even in the case where there are the stirred liquid droplets, it is still necessary to detect an ejection failure while suppressing an effect of the stir. Japanese Patent Laid-Open No. 2004-42285 discloses a method of detecting an ejection failure to this end.

Japanese Patent Laid-Open No. 2004-42285 discloses a method of suppressing an effect on liquid droplets that are stirred up due to a variation or turbulence of an airflow at the time of detection by securing predetermined suspension time after scanning with a carriage. This method does not require cumbersome operations or special structures, and is especially effective for suppressing the effect due to the variation or turbulence of the airflow associated with the action of the carriage.

SUMMARY

However, even under the situation where the effect of the airflow associated with movement of the carriage is suppressed, a flying distance of each of ink droplets ejected from a head may be reduced and the ink droplets may be stirred up without successfully reaching a detection area in a case where the ejection speed of the ink droplets is low. In the detection of an ejection failure adopting a configuration to use an optical sensor, ink droplets that are stirred up as a consequence of a failure to reach the detection area will stay in the vicinity of the detection area in a case of using an ink having a low ejection speed or in a case where the ejection speed is reduced due to aging degradation of nozzles. As a consequence, this configuration has a problem of incapability of accurately determining an ejection failure due to deterioration of detection accuracy.

In particular, the method according to Japanese Patent Laid-Open No. 2004-42285 is based on the premise that the liquid droplets stably reach the detection area. In this context, this method may fail to maintain detection accuracy and erroneously determine an ejection failure in the case of the low ejection speed of the liquid droplets.

Meanwhile, there is a method of carrying out a recovery action (so-called head cleaning) to resolve defective ejection of an ink by forcibly suctioning the ink in a nozzle from outside, and then carrying out an ejection failure detection operation again collectively as an operation of an ink jet printing apparatus in a case of determination as being in a state of ejection failure. However, in a case of erroneous determination of the state of ejection failure due to the aforementioned effect of the stir of the liquid droplets, this state does not change even after carrying out the recovery action and the unnecessary recovery processing has to be repeated. Hence, a significant detection period will be required in this case.

Given the circumstances, an object of the present disclosure is to maintain accuracy in detecting a state of ejection of liquid droplets from a nozzle so as to prevent erroneous detection while suppressing an increase in detection period.

An embodiment of the present invention is a printing apparatus including: a print head including a plurality of nozzles each configured to eject a liquid droplet to a print medium; a control unit configured to control drive of each of the nozzles so as to eject the liquid droplet; a sensor configured to detect the liquid droplet ejected from each of the nozzles; a determination unit configured to perform determination as to whether or not stir of the liquid droplet is present in a case where each of the nozzles is driven by the control unit; and an adjustment unit configured to perform adjustment of an ejection interval between the nozzles in a case of detecting the liquid droplet by using the sensor, the adjustment being carried out based on the determination as to whether or not the stir is present.

Further features of the present invention will become apparent from the following description of exemplary embodiments with reference to the attached drawings.

DESCRIPTION OF THE EMBODIMENTS

Embodiments of the present disclosure will be described below in detail with reference to the accompanying drawings.

First Embodiment

<General Outline of Printing Apparatus>

Figure 1:
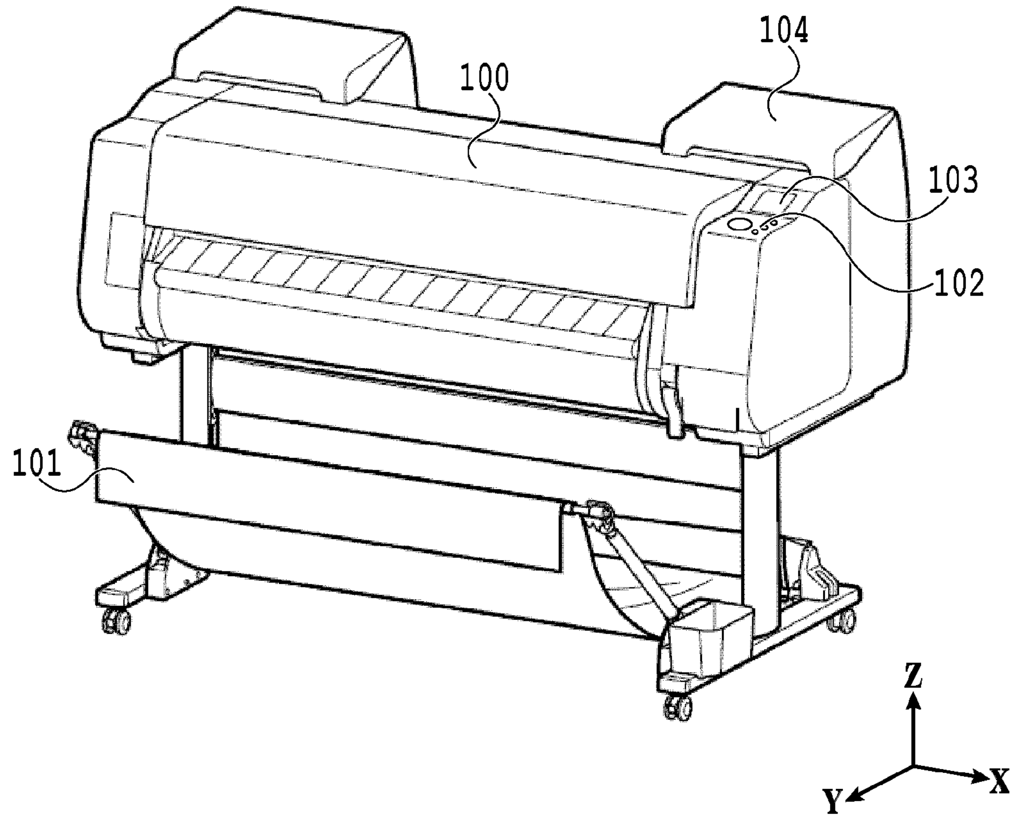
FIG. 1 is a diagram showing external appearance of a printing apparatus.

FIG. 1 is a diagram showing external appearance of an ink jet printing apparatus (hereinafter a printing apparatus) 100 representing an example of a liquid droplet ejection apparatus according to the present embodiment.

The printing apparatus 100 includes a discharging guide 101 for stacking outputted print media, operating buttons 102 used for setting print modes, print paper, and the like, and a display panel 103 for displaying a variety of print information, setting results, and the like. Moreover, the printing apparatus 100 includes an ink tank unit 104 for containing ink tanks to store color inks of black, cyan, magenta, yellow, and the like and supplying the inks to a print head 201 (FIG. 2) representing an example of a liquid droplet ejecting head. The printing apparatus 100 shown in FIG. 1 is a printing apparatus capable of printing on print media of several types with different widths up to 60-inch size print media. Rolled paper and cut paper can be used as the print media to be printed with the printing apparatus 100. Note that the print media are not limited only to the paper but may also be fabrics or vinyl, for example.

Figure 2:
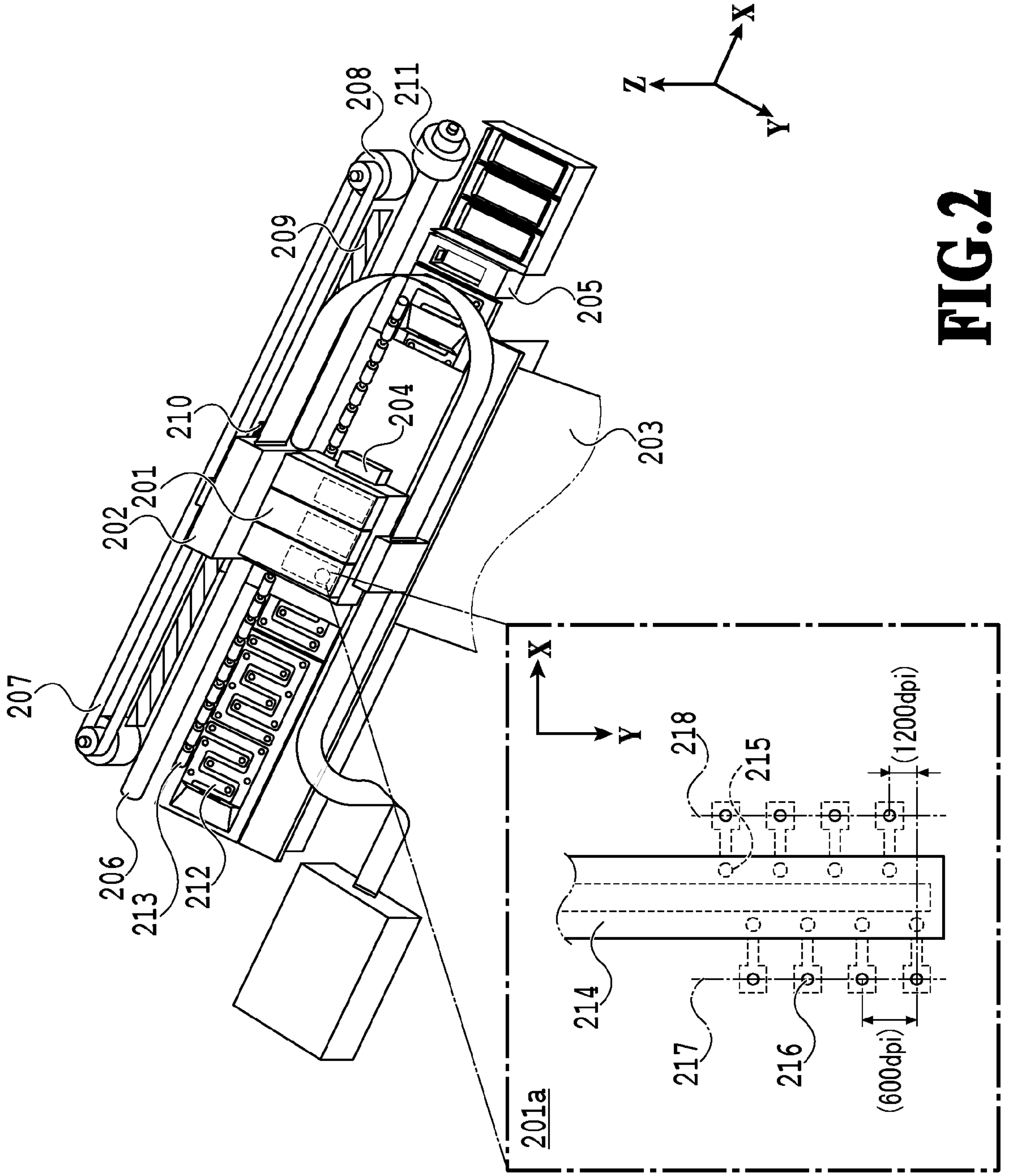
FIG. 2 is a perspective view showing an internal configuration of the printing apparatus.

FIG. 2 is a perspective view showing an internal configuration of the printing apparatus 100. A platen 212 is a member which is located at a position opposed to the print head 201 and is configured to support a print medium 203 transported to this position. The print medium 203 is transported in a direction of transportation (y direction) by a sheet transport roller 213 while being supported by the platen 212. The print head 201 is mounted on a carriage 202.

Figure 4B:
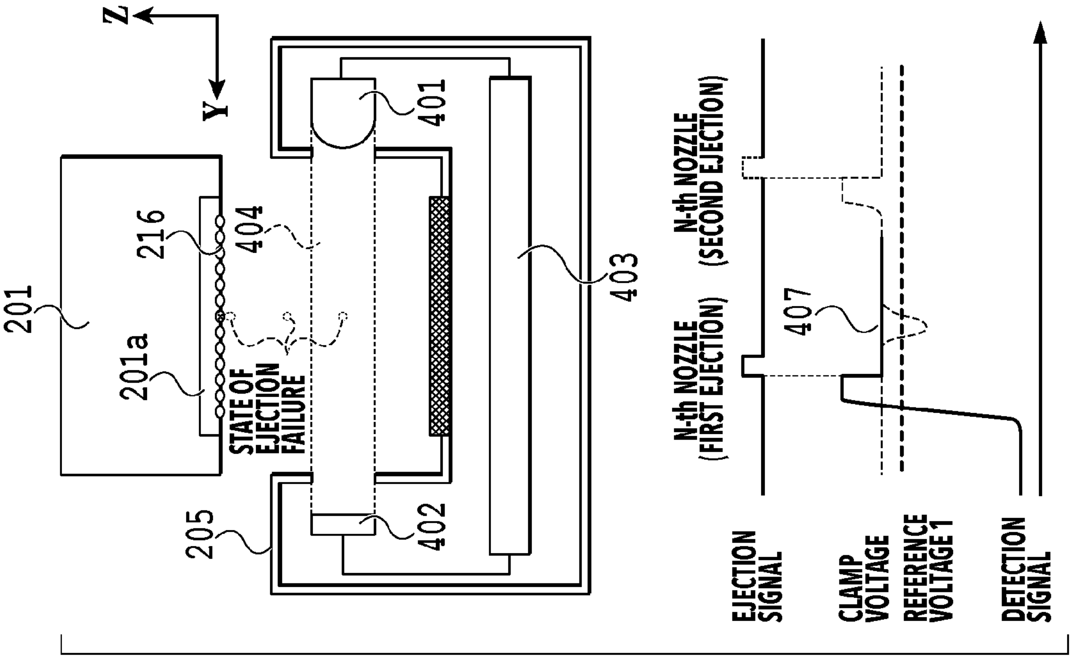
FIGS. 4A and 4B are schematic diagrams for explaining a method of detecting a state of ejection of ink droplets.
Figure 4A:
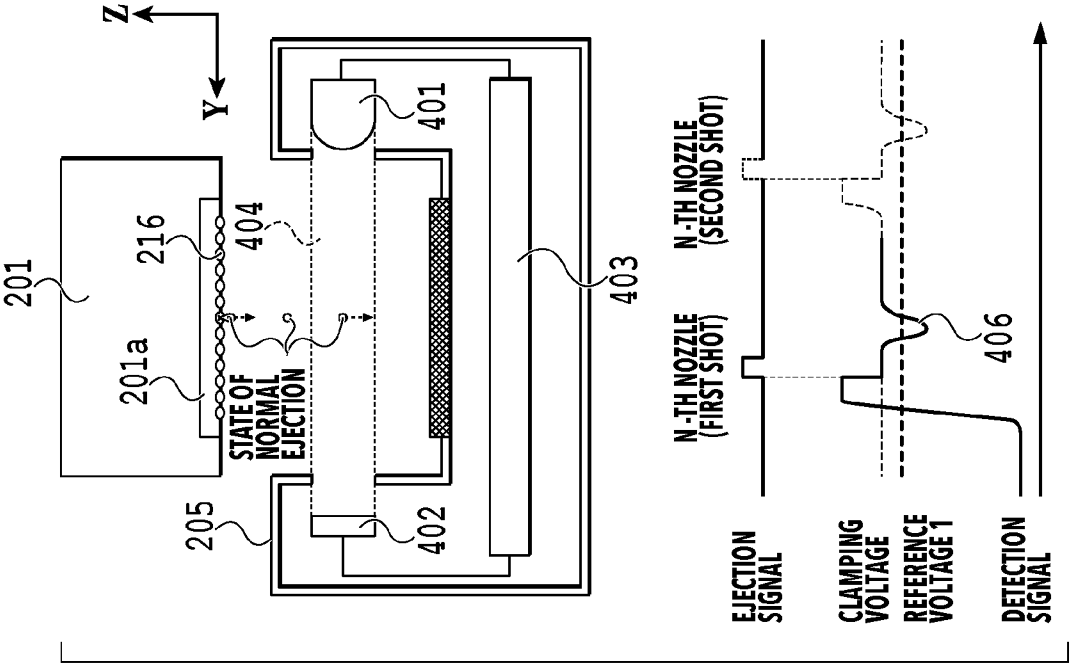

Moreover, the print head 201 includes a distance detection sensor 204 for detecting a distance between the print medium 203 on the platen 212 and the print head 201. The distance detection sensor 204 is an optical sensor which is provided with a light emitting element to emit light onto the print medium 203 and a light receiving element to receive the light reflected from the print medium 203, and is configured to measure the distance by using a change in output of an amount of light received by the light receiving element. A liquid droplet detection sensor 205 is an optical sensor configured to detect liquid droplets, which are ink droplets in this case, to be ejected from the print head. The liquid droplet detection sensor 205 includes a light emitting element 401 (FIGS. 4A and 4B), a light receiving element 402 (FIGS. 4A and 4B), and a control circuit board 403 (FIGS. 4A and 4B). The liquid droplet detection sensor 205 will be described later with reference to FIGS. 4A and 4B.

A main rail 206 is designed to support the carriage 202. The carriage 202 performs reciprocal scanning in x direction (an orthogonal direction to the direction of transportation of the print medium; hereinafter defined as a main scanning direction) along the main rail 206. The scanning with the carriage 202 is carried out by driving a carriage motor 208 so as to move a carriage transportation belt 207. A linear scale 209 is arranged in a scanning direction in which the carriage 202 performs scanning, and position information is obtained by causing an encoder sensor 210 mounted on the carriage 202 to detect the linear scale 209. In addition, the printing apparatus 100 includes a lift cam (not shown) for achieving stepwise displacement of a height of the main rail 206 that supports the carriage 202, and a lift motor 211 for driving the lift cam. A movement of the lift cam by driving the lift motor 211 makes it possible to move the print head 201 up and down, thereby increasing and decreasing a distance between the print head 201 and the print medium 203.

The print head 201 includes an ejection surface (so-called an orifice face) 201*a* provided with ejection ports, and members for forming the ejection ports as well as heaters that generate energy for ejecting liquids such as the inks are provided inside the ejection surface 201*a*. The ejection surface 201*a* is provided with common liquid chambers 214 for the respective ink colors, so that the inks can be supplied to ejection ports 216 arranged in rows through ink flow passages 215, and an image can be formed by ejecting the inks from the ejection ports while using pressures generated by driving the heaters. A row of ejection ports for each ink color is formed by arranging the ejection ports 216 in the y direction. Such rows of ejection ports are arranged in the x-axis direction. Moreover, each arranged row of ejection ports includes 2048 nozzles. These nozzles are disposed in a staggered fashion instead of a simple straight line. Accordingly, in a case where the ejection ports on respective rows of nozzles are sequentially numbered from one end thereof, each row of nozzles is divided into two rows of an ejection port row 217 including the ejection ports having odd numbers and an ejection port row 218 including the ejection ports having even numbers. Here, the ejection port row including the ejection ports having the odd numbers will be referred to as an "odd number nozzle row" and the ejection port row 218 including the ejection ports having the even numbers will be referred to as an "even number nozzle row". Accordingly, each of the odd number nozzle row and the even number nozzle row is formed from 1024 nozzles, and an interval between these nozzle rows is set to about 0.6 mm. Meanwhile, the odd number nozzle row and the even number nozzle row in each row of nozzles are combined together so as to achieve printing resolution of 1200 dpi (dots per inch), and a nozzle pitch in each of the odd number nozzle row and the even number nozzle row is set to 600 dpi. In the meantime, a liquid droplet quantity of each ink droplet ejected from the ejection surface 201*a* of the print head 201 is set mainly in a range from about 4 pl to 6 pl.

Figure 3:
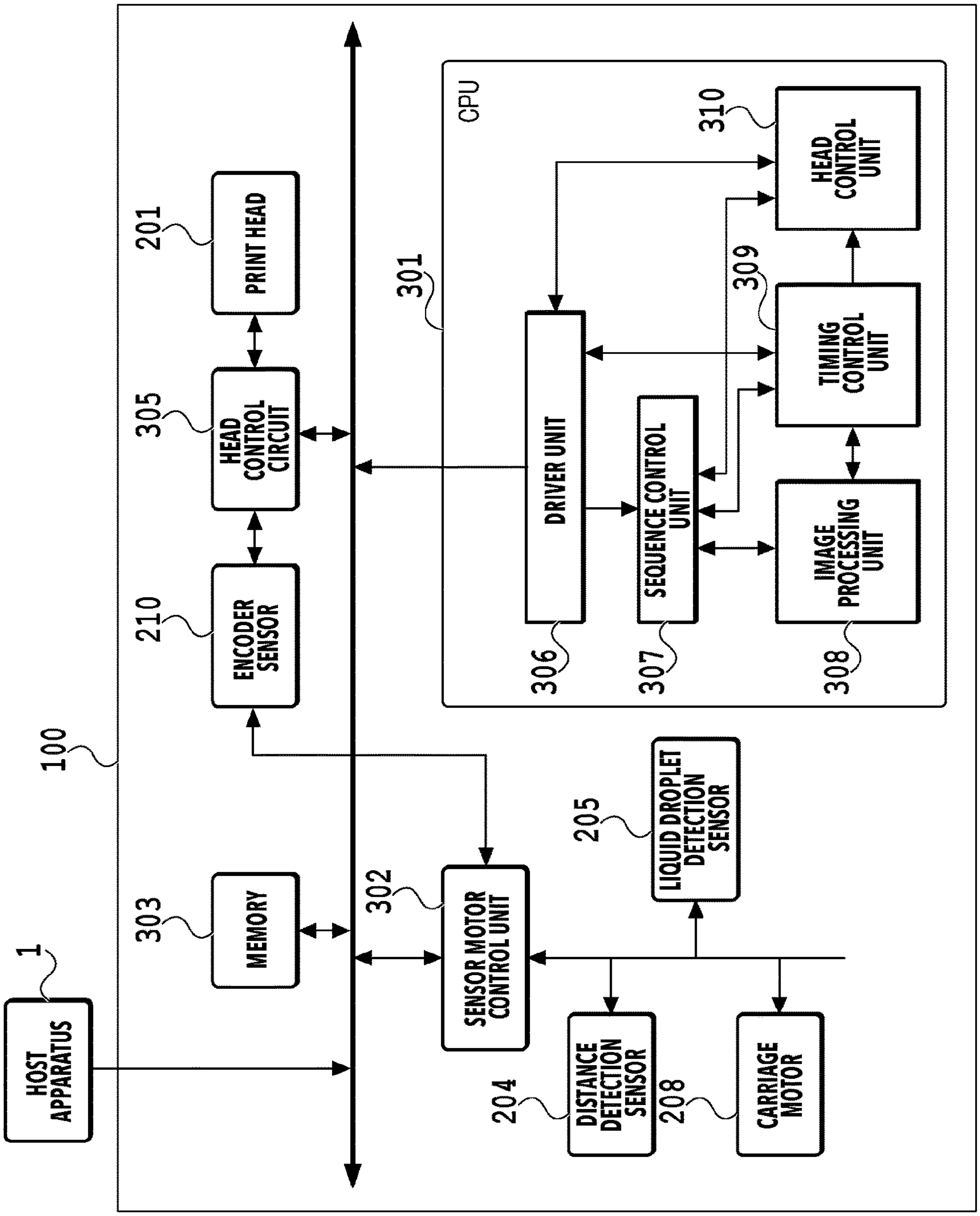
FIG. 3 is a block diagram showing a control configuration of the printing apparatus.

FIG. 3 is a block diagram showing a control configuration of the printing apparatus 100. The printing apparatus 100 includes a CPU 301 that controls the entire apparatus, a sensor motor control unit 302 that controls the respective sensors and the motor, and a memory 303 that stores a variety of information including a state of ejection, a thickness of a print medium, and so forth. The CPU 301, the sensor motor control unit 302, and the memory 303 are connected to be communicable with one another. The sensor motor control unit 302 controls the distance detection sensor 204, the liquid droplet detection sensor 205, and the carriage motor 208 that causes the carriage 202 to perform scanning. Moreover, the sensor motor control unit 302 controls a head control circuit 305 based on the position information detected with the encoder sensor 210, thereby ejecting the inks from the print head 201.

Image data transmitted from a host apparatus 1 is converted into ejection signals by the CPU 301, and the print medium 203 is printed by ejecting the inks from the print head 201 in accordance with the ejection signals. The CPU 301 includes a driver unit 306, a sequence control unit 307, an image processing unit 308, a timing control unit 309, and a head control unit 310. The sequence control unit 307 performs overall print control. To be more precise, the sequence control unit 307 performs start and stop of the image processing unit 308, the timing control unit 309, and the head control unit 310 serving as respective functional blocks, transportation control of print media, scanning control of the carriage 202, and the like. The control of the respective functional blocks included in the CPU 301 is implemented by causing the sequence control unit 307 to read various programs out of the memory 303 and to execute the programs. The driver unit 306 functions as an I/O control unit that controls input and output. For example, the driver unit 306 generates control signals for the sensor motor control unit 302, the memory 303, the head control circuit 305, and the like based on instructions from the sequence control unit 307, and transmits signals inputted from the respective blocks to the sequence control unit 307.

The image processing unit 308 subjects the image data inputted from the host apparatus 1 to color separation and converts data obtained by the color separation, thus performing image processing to convert the inputted image data into print data printable with the print head 201. The timing control unit 309 transfers the print data generated as a consequence of conversion by the image processing unit 308 to the head control unit 310 in conformity to a position of the carriage 202. Moreover, the timing control unit 309 also controls signals to be synchronized with ejection from the respective nozzles for determining a state of ejection of liquid droplets. The head control unit 310 functions as a generation unit for generating the ejection signals, and is configured to convert the print data inputted from the timing control unit 309 into the ejection signals and to output the ejection signals. Moreover, the head control unit 310 performs temperature control of the print head 201 by outputting a control signal to the extent not to eject the inks based on an instruction from the sequence control unit 307. The head control circuit 305 functions as a generation unit for generating driving pulses, and is configured to generate the driving pulses in accordance with the ejection signals inputted from the head control unit 310 and to apply the driving pulses to the print head 201.

<Method of Detecting State of Ejection of Ink Droplets>

Next, a method of detecting a state of ejection of ink droplets to be ejected from the print head 201 will be described with reference to FIGS. 4A and 4B. A diagram at an upper part of each of FIGS. 4A and 4B shows a schematic diagram of the print head 201 and the liquid droplet detection sensor 205 in the case of sectioning the printing apparatus 100 along the y-z cross-section. As shown in FIGS. 4A and 4B, the ejection ports (also referred to as nozzles) 216 for ejecting the ink droplets of the respective ink colors are provided on the ejection surface 201*a* of the print head 201 in order to generate images.

Meanwhile, a diagram at a lower part of each of FIGS. 4A and 4B shows a timing chart of an ejection signal for applying the driving pulses to the print head 201 and a signal to be detected in a case where the liquid droplet detection sensor 205 detects passage of the ink droplets ejected from the ejection ports 216. As shown in FIGS. 4A and 4B, the print head 201 includes the ejection surface 201*a*. The liquid droplet detection sensor 205 is formed from the light emitting element 401, the light receiving element 402, the control circuit board 403, and the like. The light emitting element 401 emits a light flux 404 and the light receiving element 402 receives the light flux 404 emitted from the light emitting element 401. The control circuit board 403 detects an amount of light received by the light receiving element 402. A current-voltage conversion circuit configured to convert a current flowing in accordance with the amount of light received by the light receiving element 402 into a voltage signal and to output the voltage signal, and an amplification circuit for a level of a detection signal of the ink droplet are provided on the control circuit board 403. In addition, the control circuit board 403 is provided with provided with a clamping circuit for retaining a level of the signal to be outputted from the amplification at a predetermined value (a clamping voltage) until a point immediately before observation of the ejection in order to eliminate effects such as saturation of the output and reduction in S/N ratio which are attributed to fluctuation of the level of the signal for detecting ejection of the ink droplets due to an influence of disturbance. A very small variation factor as represented by ejection of the ink droplet is detected by using the above-mentioned circuits, whereby the level of the detection signal of ejection is secured at a desired level. As a consequence, the amount of light received by the light receiving element 402 varies at the time of passage of each ink droplet across the light flux 404 in the liquid droplet detection sensor 205, and the state of ejection of the nozzles targeted for inspection is determined by using a result of comparison between the level of the outputted detection signal and a predetermined reference voltage. In the present specification, a nozzle targeted for inspection will be defined as a "target nozzle" and a nozzle located in the vicinity of the target nozzle will be defined as a "neighboring nozzle".

Meanwhile, the liquid droplet detection sensor 205 is installed such that an optical axis of the light flux 404 is located at the same position in terms of z direction as a surface of the platen 212 on one side that supports the print medium 203. Slits are provided in the vicinity of the light emitting element 401 and the light receiving element 402, respectively, and the incident light flux 404 is narrowed down so as to improve the S/N ratio. A position in the x direction of the print head 201 to enable ejection of an ink droplet in such a way that the ink droplet passes across the light flux 404 will be defined as a "detectable position". In the case of detecting an ink droplet for detecting the state of ejection of the ink droplet, the sensor motor control unit 302 controls the carriage motor 208 in accordance with an instruction from the sequence control unit 307, thereby moving the print head 201 to the detectable position. A cross-sectional area of the light flux 404 in the present embodiment is assumed to be about 2 mm×2 mm. Moreover, a parallel light projection area of the ink droplet in the case where the ink droplet passes across the light flux 404 is assumed to be around 2^−3 (mm^2). The row of ejection ports and the light flux 404 are arranged so as to satisfy a relation of being parallel to each other, and a creeping distance in a height direction (the z direction) therebetween is in set in a range from 2 to 20 mm. In the case where a creeping distance between each ejection port and the light flux 404 is reduced, it is possible to detect the state of ejection stably because the light flux 404 can detect the passage of the ink droplet at a closer position relative to a flying distance of the ejected ink droplet. However, in the case where the row of ejection ports comes close to the light flux 404, a diffused light component emitted from the light emitting element 401 is reflected from the ejection surface 201*a* of the print head 201, thereby generating a light quantity component to be received by the light receiving element 402. As a consequence, this component may overlap the detection signal as a noise component in the course of the detection of the state of ejection, and may therefore complicate favorable detection. For this reason, regarding the creeping distance between the light flux 404 of the liquid droplet detection sensor 205 and the row of ejection ports of the print head 201, it is desirable to conduct the detection of the state of ejection under a more preferable layout in consideration of the above-described correlation. In the meantime, it is desirable to dispose the light flux 404 of the liquid droplet detection sensor 205 and the platen 212 that supports the print medium 203 substantially at the same height (the z direction) for the purpose of harmonizing conditions in the case of detecting the state of ejection of the ink droplets by using the liquid droplet detection sensor 205 with the state of ejection of the ink droplets to the print medium 203 at the time of image formation.

Next, a configuration to detect the state ejection of the ink droplets to be ejected and an ejection failure thereof will be described in detail. The diagram at the lower part of FIG. 4A is a graph showing a result of detection by the liquid droplet detection sensor 205 in the case where the ejection port 216 targeted for inspection (hereinafter referred to as an "n-th nozzle") of the state of ejection of the print head 201 is successfully performing normal ejection, in the configuration as shown in the diagram at the upper part of FIG. 4A. Based on the ejection signal outputted from the head control unit 310 and the head control circuit 305, the ink droplets are ejected toward the liquid droplet detection sensor 205. The above-mentioned clamping circuit is operated by a control signal synchronized with ejection of the ink droplets, and a signal level to be outputted is retained at a predetermined clamping voltage value immediately before observing ejection of the ink droplets.

The operation by using the clamping circuit is cancelled immediately before ejection of the ink droplets is started and the ink droplets ejected toward light flux 404 block the light. Moreover, a determination is made as to whether or not the state of ejection is normal by using an amount of change in the case where the ink droplets block the light flux 404. To be more precise, the normal state of ejection is determined by detecting a fall (reference sign 406) below the reference voltage caused by a decline in light quantity that occurs at the time of passage of the ejected ink droplets across the light flux 404 of the liquid droplet detection sensor 205. Here, it is determined that the ink droplet is normally ejected from the n-th nozzle targeted for inspection. Note that FIG. 4A illustrates a result of ejection from the n-th nozzle targeted for inspection more than once (a first shot and a second shot) in order to obtain a more reliable result regarding the result of detection of the state of ejection by using the liquid droplet detection sensor 205. Regarding the state of each nozzle, the present disclosure defines a state where the nozzle can eject the ink normally as a "state of normal ejection", and defines a state where the nozzle fails to eject the ink normally due to clogging or the like as a "state of ejection failure".

The diagram at the lower part of FIG. 4B is the graph showing a result of detection in the case where the n-th nozzle targeted for inspection, which is subject to detection of the state of ejection of the print head 201, fails to eject the ink droplets normally, as described above, as shown in the diagram at the upper part of FIG. 4B, or in other words, in the case where the n-th nozzle is in the state of ejection failure. As with the case in FIG. 4A, the ink droplets are ejected toward the liquid droplet detection sensor 205 based on the ejection signal outputted from the head control unit 310 and the head control circuit 305. However, the ink droplets are not successfully ejected in the example of FIG. 4B, and the ink droplets do not fly across the light flux 404. As a consequence, the ink droplets fail to block the light flux 404 and the expected decline in light quantity that would occur in the case where the normal ejection takes place is not available (reference sign 407). Since the signal output does not fall below the reference voltage, the n-th nozzle targeted for inspection is determined to be in the state of ejection failure where the ink droplets are not ejected normally.

Next, a description will be given of a problem at the time of detection of the state of ejection failure in the above-described printing apparatus.

In the ink jet printing apparatus, the flying distance of the ejected ink is shortened in the case of the low ejection speed of the liquid droplets ejected from the print head, and the ink may therefore fail to reach a detection area at a predetermined speed. In the ejection failure inspection with the configuration using the optical sensor, liquid droplets that fail to reach the detection area and get stir up may stay in the air and block the light flux 404 in a case of using the ink having the low ejection speed or in the case where the ejection speed is reduced due to aging degradation of the nozzles. As a consequence, there is a problem of incapability of accurate detection of an ejection failure due to deterioration of detection accuracy.

Next, a correlations between the ejection speeds and flying distances of the ink droplets (the liquid droplets) ejected from the respective ejection ports 216 arrayed on the ejection surface 201*a* of the print head 201 will be described with reference to FIGS. 5A and 5B. In each of graphs shown in FIGS. 5A and 5B, the vertical axis indicates the ejection speed of the ejected ink droplets and the horizontal axis indicates the flying distances of the ejected ink droplets. In a case where the gravitational force and the force of air resistance are applied to the ink droplets ejected vertically downward from the print head 201 is a stopped state, the ejection speed is gradually attenuated and eventually reaches a constant speed, thus asymptotically converging to a linear uniform motion. As a result of a test conducted by the inventor of the present application, in the case of an ink droplet having an extremely small mass, the ejected ink droplet almost loses its speed down to 0 m/s at a moment of equilibrium between the gravitational acceleration and air resistance, and eventually turns into a state of floating or staying in a weak airflow that flows around.

Figure 5A:
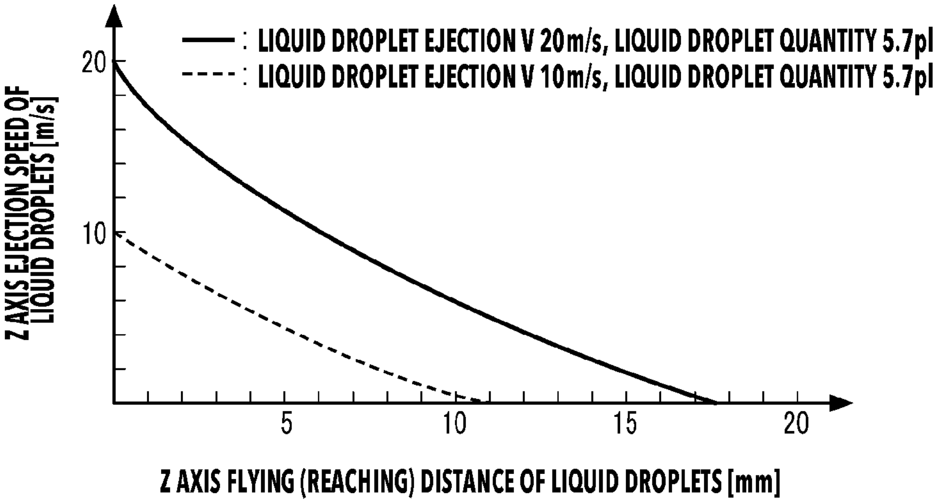
FIGS. 5A and 5B are diagrams showing correlations between ejection speeds and flying distances of ink droplets.

FIG. 5A shows behaviors of attenuation from initial speeds in a case of ejecting the ink droplet at an initial ejection speed of 20 m/s and in a case of ejecting the ink droplet at an initial ejection speed of 10 m/s while setting a liquid droplet quantity of each ink droplet to 5.7 pl. As shown in FIG. 5A, in the case where the liquid droplet quantity is set to 5.7 pl, each ink droplet loses its velocity component and transitions to a staying state in the case where the flying distance of the ejected ink droplet reaches a distance of about 17.4 mm or 10.7 mm.

Figure 5B:
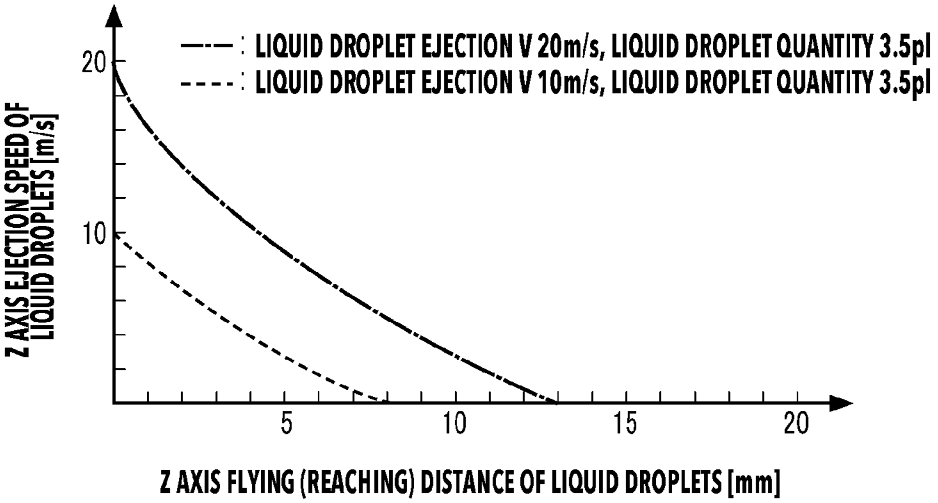

On the other hand, FIG. 5B shows behaviors of attenuation from initial speeds in a case of ejecting the ink droplet at an initial ejection speed of 20 m/s and in a case of ejecting the ink droplet at an initial ejection speed of 10 m/s while setting the liquid droplet quantity of each ink droplet to 3.5 pl. As shown in FIG. 5B, in the case where the liquid droplet quantity is set to 3.5 pl, each ink droplet loses its velocity component and transitions to a staying state in the case where the flying distance of the ejected ink droplet reaches a distance of about 13.2 mm or 7.9 mm.

From the results shown in FIGS. 5A and 5B, it is understood that the flying distance of the ink droplet changes with the initial ejection speed at the time of ejection from the print head 201 regardless of the liquid droplet quantity of the ink droplet. It is also understood that the distance that the ink droplet can reach, or in other words, the flying distance of the ink droplet varies depending on the liquid droplet quantity of the ejected ink droplet.

Figure 6A:
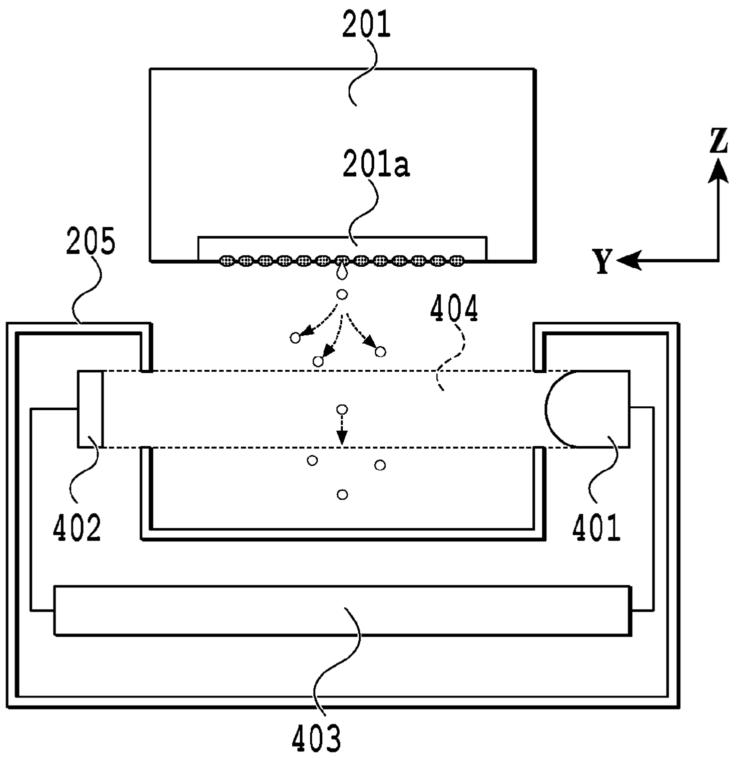
FIGS. 6A and 6B are schematic diagrams showing a state of ejection in a case where ink droplets are stirred up.
Figure 6B:
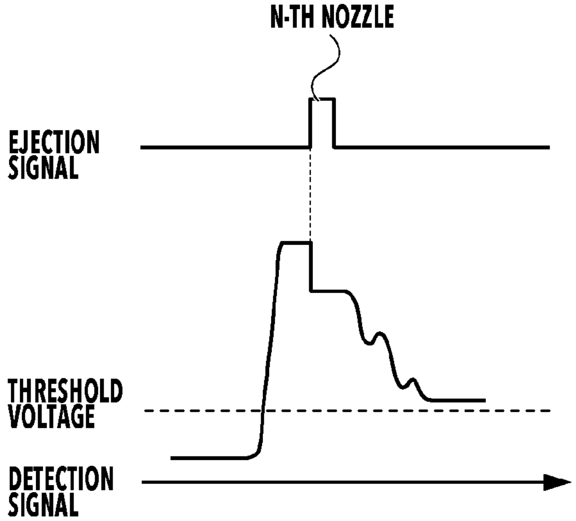

FIG. 6A is a schematic diagram showing a state where the ink droplets ejected from the nozzle are stirred up due to a drop in the ejection speed. As with the case in the diagram at the upper part of FIG. 4A, the ink droplets are ejected toward the liquid droplet detection sensor 205 based on the ejection signal outputted from the head control unit 310 and the head control circuit 305. However, part of the ink droplets ejected do not reach the light flux 404 and stay in the upper part in FIG. 6A. As a consequence, the ink droplets fail to sufficiently block the light flux 404 and the expected decline in light quantity that would occur in the case where the normal ejection takes place is not available. As a consequence, as shown in FIG. 6B, the signal output does not fall below a threshold voltage set equal to the value of the reference voltage, and the state of ejection cannot be detected. Here, the n-th nozzle targeted for inspection is detected to be in the state of ejection failure even though this nozzle is achieving the normal ejection. On the other hand, in the case where the ink droplets stay in the light flux 404, the liquid droplet detection sensor 205 increases the current to be fed to the light emitting element 401 in order to maintain the amount of light received by the light receiving element 402 at a constant level. This leads to reduction in sensitivity to detect the liquid droplets to be ejected subsequently, whereby accuracy is degraded at the time of detecting the state of ejection of the subsequent nozzle (an n+1-th nozzle) and so on.

Meanwhile, there is a method of carrying out a recovery action (so-called head cleaning) to resolve defective ejection of an ink by forcibly suctioning the ink in a nozzle from outside, and then carrying out an ejection failure detection operation again collectively as an operation of an ink jet printing apparatus in a case of determination as being in a state of ejection failure. However, in a case of erroneous determination as the state of ejection failure due to an effect of stir of ink droplets, this state does not change even after carrying out the recovery action and the unnecessary recovery processing has to be repeated. Hence, a significant detection period will be required. The method according to Japanese Patent Laid-Open No. 2004-42285 is based on the premise that the liquid droplets stably reach the detection area. In this context, this method may fail to maintain detection accuracy and erroneously determine an ejection failure in the case of the low ejection speed of the liquid droplets.

The present embodiment is designed to suppress degradation of detection accuracy due to the aforementioned effect of the stir of the liquid droplets. Now, a detection operation of the state of ejection according to the present embodiment will be described below with reference to FIG. 7.

Figure 7:
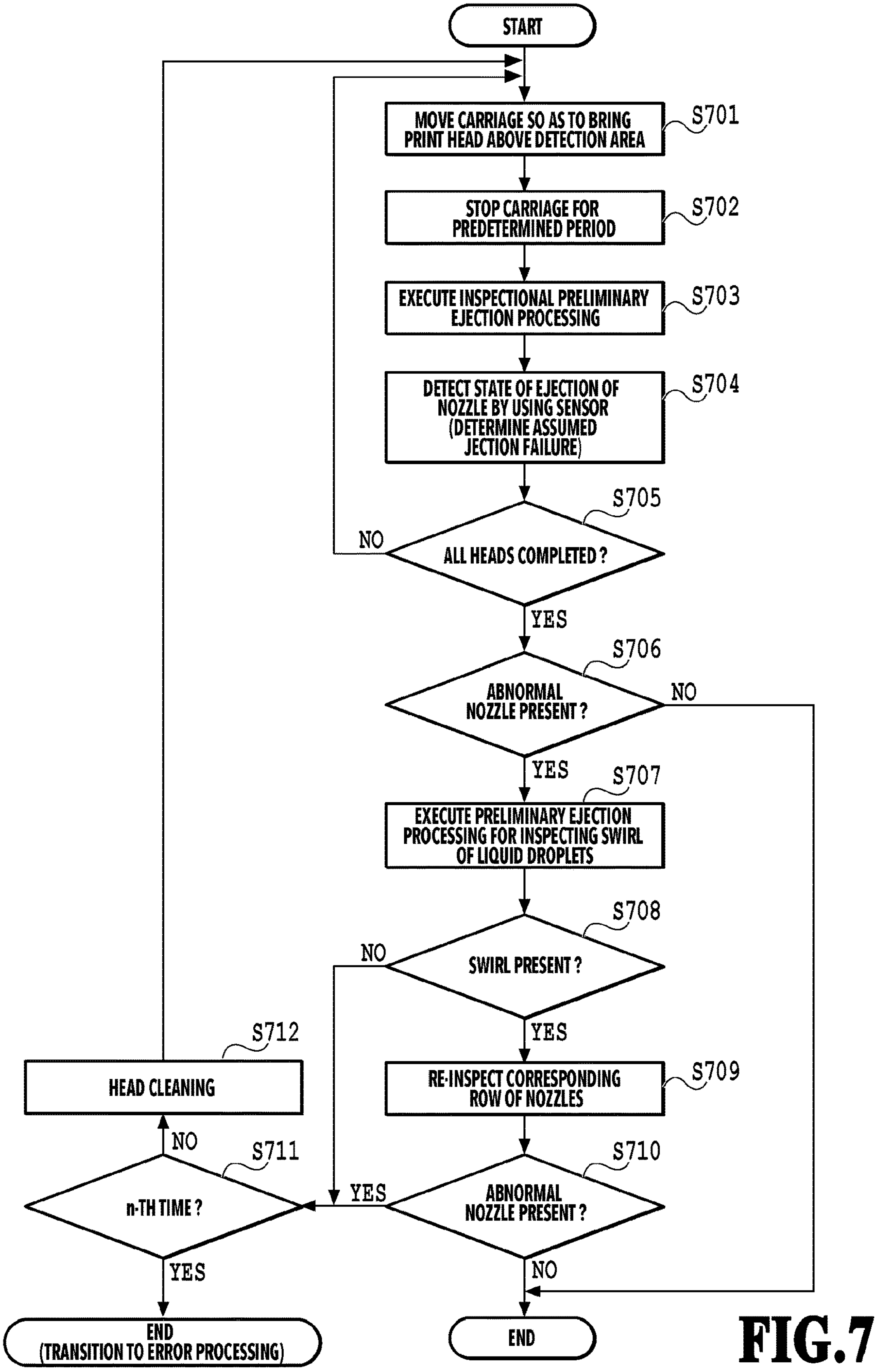
FIG. 7 is a flowchart of processing to detect a state of ejection.

FIG. 7 is a flowchart of control according to the present embodiment concerning processing to detect the state of ejection. The processing of FIG. 7 is carried out at the time of an operation at initial installation in the case where a user operates the printing apparatus 100 for the first time, or in a case where the user replaces the print head 201 with a new one, or more specifically, immediately after attachment of the new print head 201, and so forth. This processing may also be executed regularly by the user as maintenance work after using the printing apparatus 100 for a predetermined period. Moreover, the processing may be directly executed in accordance with an instruction by the user. Note that the processing of FIG. 7 is the processing to be carried out by the sequence control unit 307 of the CPU 301 in accordance with a program stored in the memory 303, for example.

In the case where the carriage 202 moves in the x direction shown in FIG. 2 and reaches in the vicinity of a preliminary ejection port where the preliminary ejection takes place, this movement of the carriage generates an airflow in a detection area for the liquid droplet detection sensor 205 inside the preliminary ejection port. Accordingly, in the case where the detection operation of the state of ejection associated with the preliminary ejection is carried out immediately after the print head 201 reaches an upper part of the preliminary ejection port, the airflow in the detection area is not stabilized and the detection takes place in a state where ink droplets are apt to be stirred up as shown in FIGS. 5A and 5B. As a consequence, noise is increased during the detection. For this reason, it is desirable to start the detection operation of the state of ejection at preset timing such as a point in the course of a printing operation as well as before and after the printing operation based on image data (or print data) received by the printing apparatus, and a point of execution of a suctioning recovery action.

In step S701, the sequence control unit 307 moves the print head 201 202 such that the encoder sensor 210 is located above the detection area (more specifically, above the upper part of the preliminary ejection port that carries out the preliminary ejection). Note that the expression "step SXXX" will be hereinafter abbreviated to "SXXX".

In S702, the sequence control unit 307 stops the carriage 202 for a predetermined period. In this instance, neither the operation to move the carriage 202 nor the ejection operation is carried out. Here, the period to stop the carriage 202 is set longer than a period required to settle turbulence of the air in the detection area caused by the movement of the carriage 202. The stop period may vary depending on the shape of the preliminary ejection port, the shape and a moving speed of the carriage 202, a location of the liquid droplet detection sensor 205, and so forth. Although it is difficult to generally determine the stop period, the stop period is roughly a period in a range from several to several tens of seconds.

In S703, the sequence control unit 307 executes preliminary ejection processing in order to inspect whether the nozzle is in the state of normal ejection or state of ejection failure.

In S704, the sequence control unit 307 detects the state of ejection of the nozzle by using the liquid droplet detection sensor 205. To be more precise, the light receiving element 402 can obtain a signal indicating whether or not the ink droplet ejected from the nozzle in S703 passes across the light flux 404 by means of reception of the light. The detection processing in this step is executed one by one for all the nozzles provided to the print head 201. Moreover, a nozzle assessed to be in the state of ejection failure in this step is determined to have an assumed ejection failure.

In S705, the sequence control unit 307 determines whether or not the inspection processing from S701 to S704 has been completed for all the print heads provided to the printing apparatus. The processing proceeds to S706 in the case where a result of determination in this step is true. On the other hand, in the case where the result of determination in this step is false, the processing returns to S701 and the processing to detect the state of ejection of the next print head is executed.

In S706, the sequence control unit 307 determines the presence of any abnormal nozzles in the print head 201 based on the result of the processing in S701 to S705. Here, an abnormal nozzle is the nozzle in the state of ejection failure, or more specifically, the nozzle determined to have the assumed ejection failure in S704. The processing proceeds to S707 in the case where an abnormal nozzle is determined to be present in this step. On the other hand, the series of inspection processing is terminated in the case of determination that there are no abnormal nozzles in this step.

Figure 9:
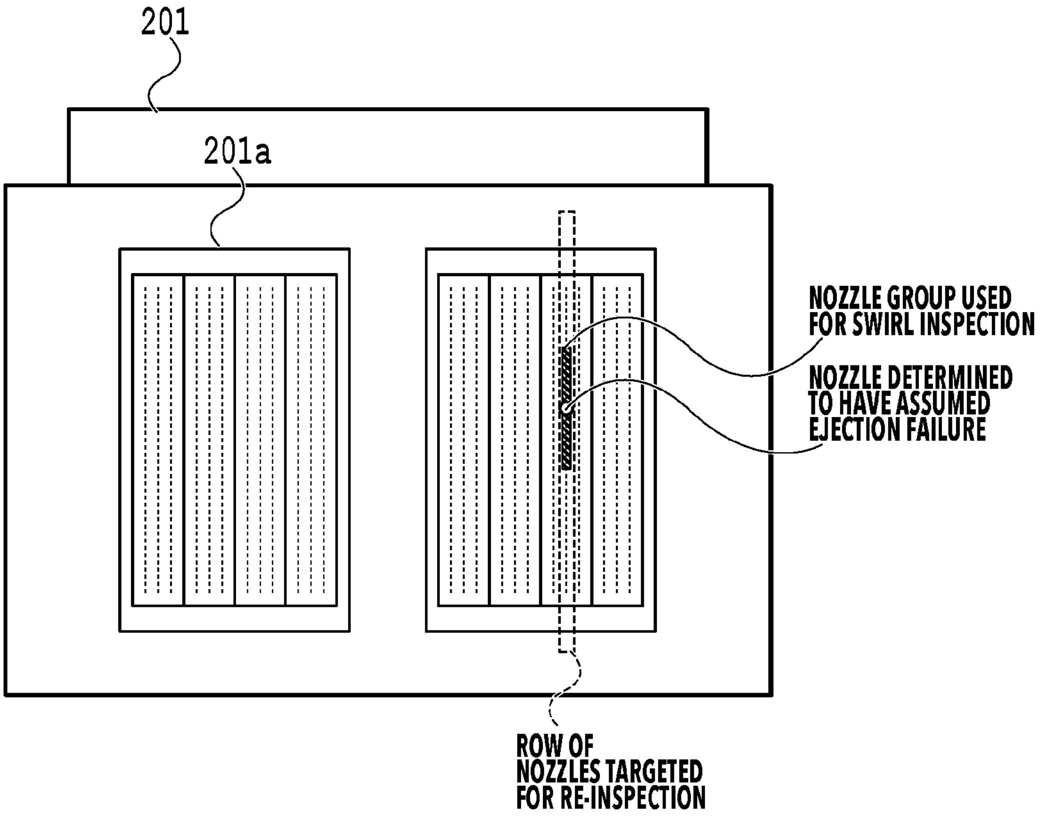
FIG. 9 is a diagram showing locations targeted for re-inspection.

In S707, the sequence control unit 307 carries out inspectional preliminary ejection processing for determining the presence of stir of liquid droplets. To be more precise, a nozzle group including the nozzle determined to have the assumed ejection failure in S704 and at least two nozzles located at anteroposterior positions relative to the former nozzle in the row of nozzles to which the former nozzle belongs is designated as a nozzle group including the nozzle determined to have the assumed ejection failure. Then, the designated nozzle group is subjected to the preliminary ejection. Here, the number of nozzles included in the designated nozzle group, and the number of ejected shots in the inspectional preliminary ejection are determined based on the specifications of the printing apparatus targeted for inspection. For example, the nozzle group may consist of three nozzles in total including the nozzle determined to have the assumed ejection failure and two nozzles located at the anteroposterior positions relative to the former nozzle (in other words, the nozzles adjacent to the nozzle determined to have the assumed ejection failure in the y direction). Alternatively, the nozzle group may include two or more nozzles each at the anterior position and the posterior position as illustrated in FIG. 9. After all, the number of nozzles is preferably set to an appropriate number that can clearly bring about a difference between the number of liquid droplets detected in the detection area and the number of liquid droplets detected in a non-detection area. In the meantime, an ejection method in the preliminary ejection is carried out for each of the nozzles in the nozzle group determined in accordance with the above-mentioned method. Then, the carriage is moved in the x direction (the main scanning direction) shown in FIG. 2, and the ejection is carried out while changing the positions of ejection. Note that each of the terms “detection area” and “non-detection area” stated herein is assumed to represent a predetermined partial area on xy plane of a nozzle orifice surface.

A start position and an end position (which are positions in the x direction) of ejection in the inspectional preliminary ejection processing in S707 are determined based on the specifications of the printing apparatus targeted for inspection. In this instance, a home side (a side where the print head is located during standby) may be set to the start position of ejection while an away side may be set to the end position thereof. Alternatively, the away side may be set to the start position while the home side may be set to the end position. In any case, the setting should be made in such a way as to include at least an area where the ink droplets ejected from the nozzles of the nozzle group pass across the light flux and an area where the ink droplets do not pass across the light flux. The respective nozzles in the nozzle group are sequentially subjected to ejection of the ink. In the case where ejection from all of the nozzles in the nozzle group is completed, the carriage is moved to the next inspection position (a position in the x direction) and then the similar operation is carried out again. Here, a moving distance of the carriage is set to such a distance that is defined as a minimum moving distance in accordance with the position information to be detected by using the linear scale 209 arranged in the main scanning direction and the encoder sensor 210 mounted on the carriage 202. The above-described operation is repeatedly carried out until reaching the end position of ejection, and the inspection in S707 is terminated after completion of ejection at all of the inspection positions.

Figure 8A:
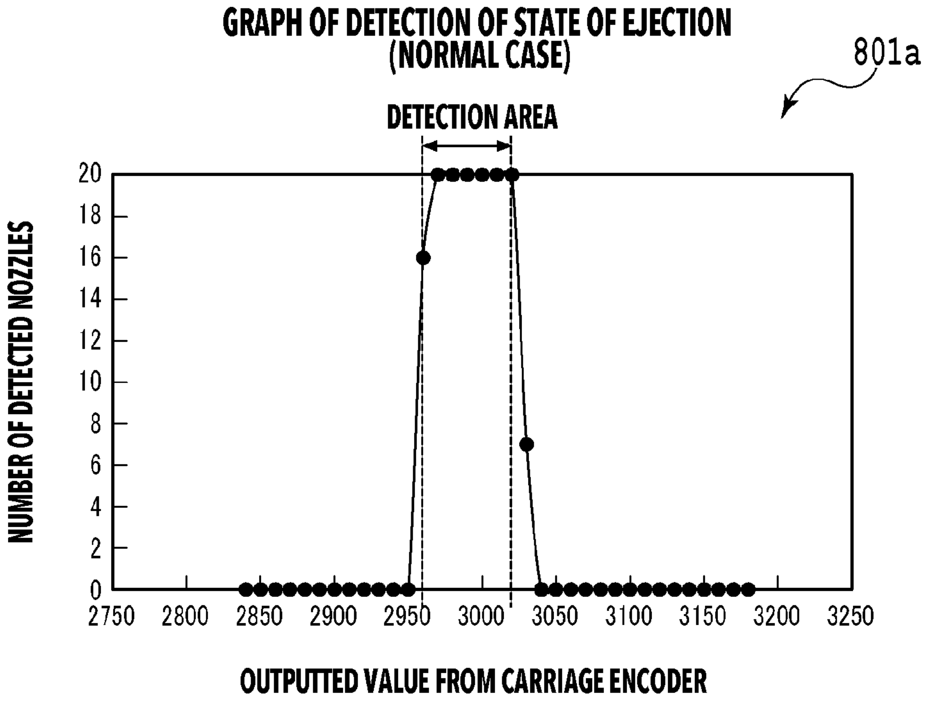
FIGS. 8A and 8B are graphs showing relations between positions of ejection and the number of detected nozzles.
Figure 8B:
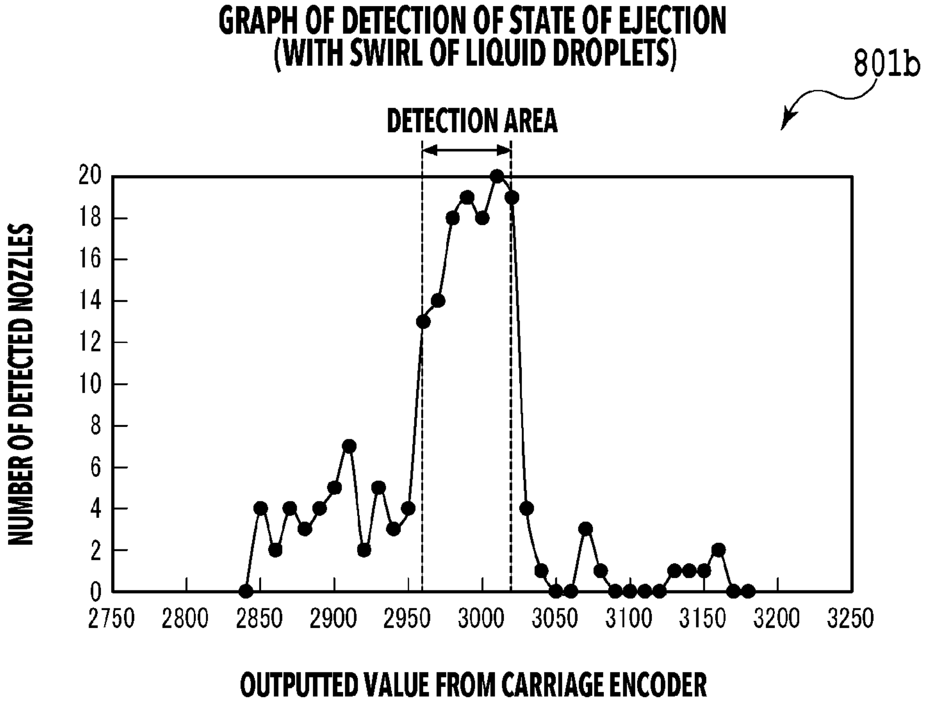

In S708, the sequence control unit 307 refers to a result of inspection in S707, thereby determining the presence of the stir of the liquid droplets. In the present embodiment, graphs showing the state of ejection of the liquid droplets as plotted in FIGS. 8A and 8B are used in a method of determining the presence of the liquid droplets. In each of the graphs shown in FIGS. 8A and 8B, the horizontal axis indicates an outputted value from the encoder sensor 210 and the vertical axis indicates a counted value of the number of nozzles from which the ejected liquid droplets are detected by the liquid droplet detection sensor 205. The outputted value from the encoder sensor 210 represents the position of the carriage in the main scanning direction. Accordingly, the outputted value schematically indicates the position in the main scanning direction of the nozzle that performs the inspectional preliminary ejection. Meanwhile, in each of the graphs shown in FIGS. 8A and 8B, each dotted line represents an end portion of the detection area. A graph 801*a* in FIG. 8A is a graph showing a state in which each nozzle is performing normal ejection without stirring up the liquid droplets. On the other hand, a graph 801*b* in FIG. 8B is a graph showing a state in which liquid droplets are stirred up.

In the case where no liquid droplets are stirred up, as shown in FIG. 8A, almost all the nozzles that eject the liquid droplets are detected in the detection area whereas no nozzles that eject the liquid droplets are detected outside the detection area.

On the other hand, in the case where the liquid droplets are stirred up, as shown in FIG. 8B, disturbance in sensitivity is observed outside the detection area more frequently than the normal case shown in FIG. 8A, and erroneous detection is prominent outside the detection area in particular. In S708, reference is made to the graph plotted based on the result of S707, and the case where there is disturbance in sensitivity outside the detection area is determined as a state under an effect of the stir of the liquid droplets. Then, the processing proceeds to S709. On the other hand, in the case where no disturbance in sensitivity is observed outside the detection area, this state is determined as a state without an effect of the stir of the liquid droplets. Then, the processing proceeds to S711. Here, as a means of determining the presence of disturbance in sensitivity, an appropriate threshold may be set up in conformity to the specifications of the printing apparatus. Alternatively, a graph representing a result of ejection under similar ejection conditions conducted before shipment of a product may be stored in advance in the memory 303 as a benchmark for indicating a normal state of ejection, and this graph may be compared with the result obtained in S707.

Figure 10A:
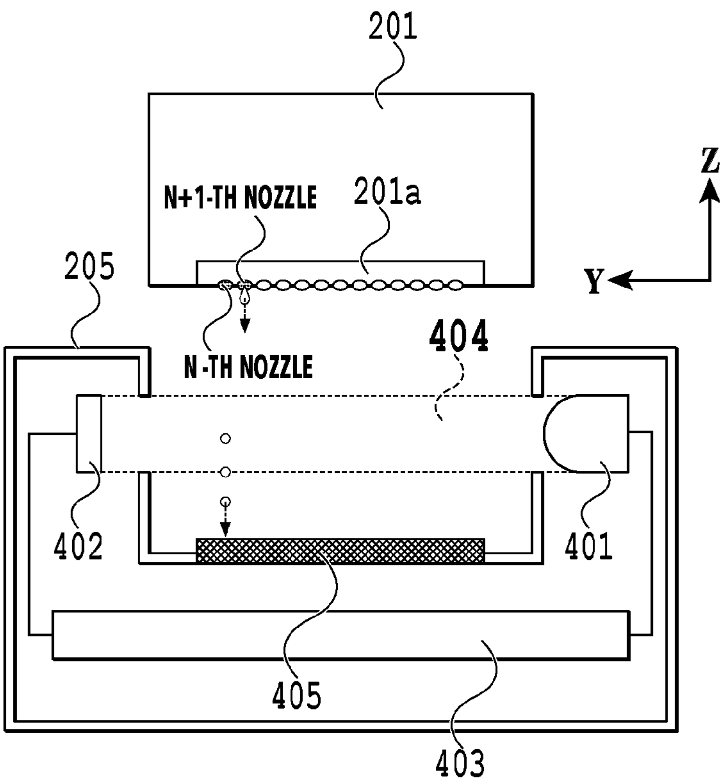
FIGS. 10A and 10B are diagrams for explaining a re-inspection method.
Figure 10B:
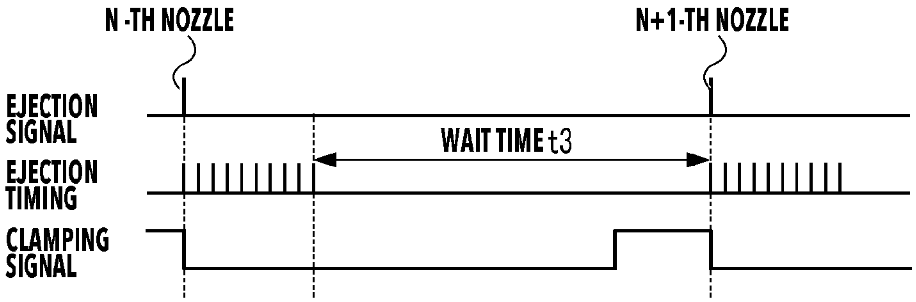

In S709, the sequence control unit 307 sets the row of nozzles (see FIG. 9), which includes the nozzle group that is determined to be under the effect of the stir of the liquid droplets, as a target for re-inspection and then carries out the inspection processing again for detecting the state of ejection. In the case of carrying out the re-inspection, the processing to detect the state of ejection is executed after adjusting an ejection interval (wait time) between the nozzles in order to prevent the disturbance in sensitivity attributed to the effect of the stir of the liquid droplets. Here, a time that is longer than a time with which it is possible to settle the stirred liquid droplets so that the majority of the liquid droplets ejected in the preliminary ejection can reach a waste ink absorber 405 is set as the wait time (defined as t3; see FIGS. 10A and 10B). This setting enables ejection of the next nozzle in the state where the stirred liquid droplets generated by ejection are settled. Accordingly, it is possible to accurately determine whether or not the nozzle that is determined to have the assumed ejection failure is in the state of ejection failure. In the meantime, the wait time for a nozzle determined to have the stir of the liquid droplets is longer than the wait time for a nozzle determined not to have the stir of the liquid droplets. The processing proceeds to S710 in the case where detection of the state of ejection of the nozzles included in all the nozzle groups targeted for re-inspection is completed. Here, the row of nozzles including the nozzle group determined to be under the effect of the stir of the liquid droplets is targeted for re-inspection. Instead, only the relevant nozzle group may be targeted for re-inspection.

In S710, the sequence control unit 307 receives results in S707 to S709 and determines the presence of an abnormal nozzle in the print head 201. The abnormal nozzle is a nozzle in the state of ejection failure. The processing proceeds to S711 in the case where the abnormal nozzle is determined to be present in this step. On the other hand, the series of processing is terminated in the case where no abnormal nozzles are determined to be present in this step.

In S711, the sequence control unit 307 determines whether or not the number of times of determination that the abnormal nozzle is present reaches a given threshold (defined as n). Note that the threshold n used in this step is assumed to be predetermined based on the use of the printing apparatus targeted for inspection. In the case where the number of times of determination that the abnormal nozzle is present reaches the given threshold n and a result of determination in this step is true, the series of the inspection processing shown in FIG. 7 is terminated and error processing will be carried out. Here, the error processing is processing to display an error message and an error code on the display panel 103 in order to notify the user of the presence of a number of nozzles in the state of ejection failure. For example, in a case where the error message to be displayed intends to recommend a powerful cleaning operation, the user can resolve the state of ejection failure of the nozzles by operating a cleaning action which is more powerful than head cleaning to be carried out in S712. On the other hand, in a case where the error message notifies of a failure of a unit or recommends replacement thereof, the user can order repair service by consulting with a manufacturer of the printing apparatus depending on the condition of the failure of the printing apparatus. The processing proceeds to S712 in the case where the number of times of determination that the abnormal nozzle is present does not reach the given threshold n yet and the result of determination in this step is false.

In S712, the sequence control unit 307 executes the head cleaning as the recovery action for resolving the ejection failure of the nozzles. Thereafter, the processing returns to S701 and the processing to detect the state of ejection of each nozzle is executed again.

Effect of Present Embodiment

According to the present embodiment, in a case where an arbitrary nozzle is subjected to inspection as to whether the nozzle is in the state of normal ejection or in the state of ejection failure, it is possible to avoid a case of erroneously detecting the nozzle as being in the state of ejection failure due to an effect of stir of liquid droplets. Moreover, it is possible to reduce inspection time by avoiding execution of unnecessary recovery actions (head cleaning).

Second Embodiment

A second embodiment will be described below. In the following description, different features from those in the first embodiment will mainly be discussed and explanations concerning the same details as those in the first embodiment will be omitted as appropriate.

Figure 11:
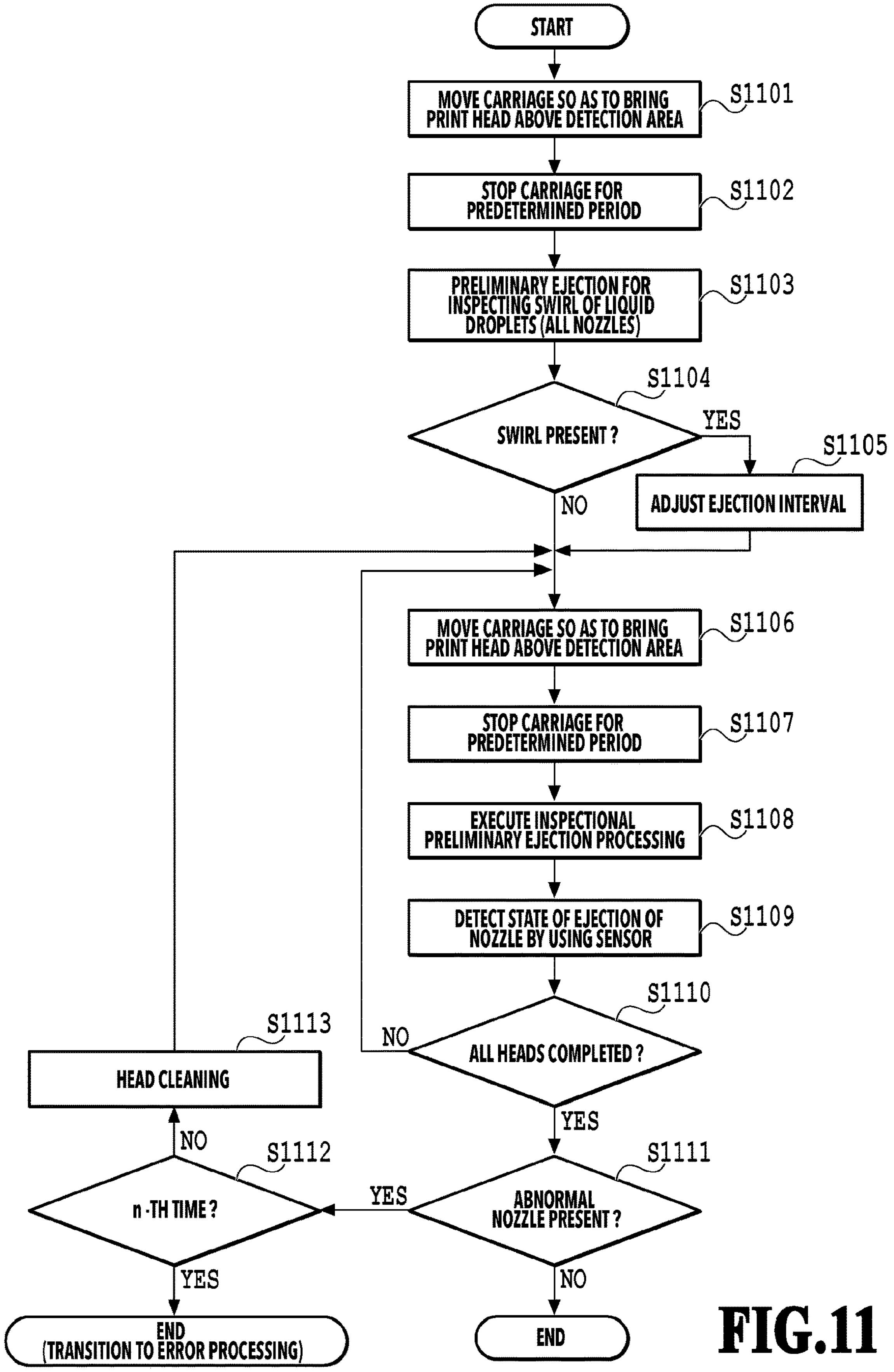
FIG. 11 is a flowchart of processing to detect a state of ejection.

FIG. 11 is a flowchart of control according to the present embodiment concerning processing to detect a state of ejection. The processing of FIG. 11 is the processing to be carried out by the sequence control unit 307 of the CPU 301 in accordance with a program stored in the memory 303, for example. Of the processing shown in FIG. 11, respective procedures from S1106 to S1110 and from S1112 to S1113 are the same as the respective procedures from S701 to S705 and from S711 to S712 in FIG. 7. Accordingly, explanations concerning these overlapping portions will be omitted.

The first embodiment is configured to carry out the inspection of the stir of the liquid droplets after the determination of the assumed ejection failure in accordance with the ordinary detection of the state of ejection (S707 to S705, . . . , S707 in FIG. 7). However, this configuration may erroneously determine a nozzle in the state of detection failure as a nozzle in the state of normal ejection because of the liquid droplets that stay on the light flux depending on the timing to detect the state of ejection. Given the circumstances, according to the present embodiment, all the nozzles are subjected to an inspection concerning the stir of the liquid droplets before carrying out the detection of the state of ejection in order to improve detection accuracy.

In step S1101, the sequence control unit 307 moves the print head 201 such that the encoder sensor 210 is located above the detection area.

In S1102, the sequence control unit 307 stops the carriage 202 for a predetermined period.

After the movement of the carriage is completed in S1101 and S1102, the sequence control unit 307 carries out the inspection for determining the presence of stir of liquid droplets in S1103. In the present embodiment, all the nozzles provided to the print head 201 are subjected to this inspectional preliminary ejection. Here, as with the first embodiment, the number of ejected shots in the inspectional preliminary ejection is determined based on the specifications of the printing apparatus targeted for inspection. Meanwhile, as for the ejection method in the preliminary ejection, ejection is carried out while changing positions in the x direction (see FIG. 2) for each row of nozzles.

In S1104, the sequence control unit 307 refers to a result of inspection in S1103, thereby determining the presence of the stir of the liquid droplets. As with the first embodiment, the graphs showing the state of ejection of the liquid droplets as plotted in FIGS. 8A and 8B are used in the determination method in this step, and the determination is carried out for each of the rows of nozzles. In S1104, reference is made to a graph plotted based on the result of S1103. In the case where there is disturbance in sensitivity outside the detection area, this state is determined as a state under the effect of the stir of the liquid droplets. Then, the processing proceeds to S1105. On the other hand, in the case where no disturbance in sensitivity is observed outside the detection area, this state is determined as a state without an effect of the stir of the liquid droplets. Then, the processing proceeds to S1106. Here, as a means of determining the presence of disturbance in sensitivity, an appropriate threshold may be set up in conformity to the specifications of the printing apparatus as with the first embodiment. Alternatively, a graph representing a result of ejection under similar ejection conditions conducted before shipment of a product may be stored in advance in the memory 303 as a benchmark, and this graph may be compared with the result obtained in S1103.

In S1105, the sequence control unit 307 adjusts an ejection interval between the nozzles regarding the row of nozzles that exhibits disturbance in sensitivity. Here, as with the first embodiment, a time that is longer than a time with which it is possible to settle the stirred liquid droplets so that the majority of the liquid droplets ejected in the preliminary ejection can reach the waste ink absorber 405 is set as the wait time (defined as t3; see FIGS. 10A and 10B). This setting enables ejection of the next nozzle in the state where the effect of the stir of the liquid droplets generated by ejection are settled. Accordingly, it is possible to accurately determine whether or not the nozzle is in the state of ejection failure in the course of the detection of the state of ejection carried out in S1106 and so on.

In S1109, the sequence control unit 307 detects the state of ejection of the nozzle by using the liquid droplet detection sensor 205. To be more precise, the light receiving element 402 can obtain a signal indicating whether or not the ink droplet ejected from the nozzle in S703 passes across the light flux 404 by means of reception of the light. The detection processing in this step is executed one by one for all the nozzles provided to the print head 201. As a consequence of adjustment of the ejection interval between the nozzles in S1105, the ejection interval between the nozzles to be applied to the nozzle determined to have the stir in this step is longer than the ejection interval to be applied to the nozzle determined not to have the stir.

Effect of Present Embodiment

According to the present embodiment, all the nozzles targeted for inspection are subjected to the determination of presence of the stir of the liquid droplets before determining whether the nozzles are in the state of normal ejection or in the state of ejection failure. In this way, it is possible to improve accuracy of determination as to whether or not the nozzle is in the state of normal ejection or in the state of ejection failure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to maintain accuracy in detecting a state of ejection of liquid droplets from a nozzle so as to prevent erroneous detection while suppressing an increase in detection period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-092338, filed Jun. 7, 2022, which is hereby incorporated by reference herein in its entirety.

What is claimed is:

1. A printing apparatus comprising:

a print head including a plurality of nozzles each configured to eject a liquid droplet to a print medium;

a control unit configured to control drive of each of the plurality of nozzles so as to eject the liquid droplet;

a sensor configured to detect the liquid droplet ejected from each of the plurality of nozzles;

a swirl determination unit configured to perform a swirl determination as to whether or not there is present a swirl of the liquid droplet due to a variation or turbulence of a surrounding airflow in a case where a nozzle of the plurality of nozzles is driven by the control unit;

an adjustment unit configured to perform adjustment of an ejection interval between nozzles in a case of detecting the liquid droplet by using the sensor, the adjustment being carried out based on the swirl determination;

an assumed ejection failure determination unit configured to determine one of the plurality of nozzles driven by the control unit as a target nozzle having an assumed ejection failure in a case where the sensor fails to detect the liquid droplet from the nozzle; and a designation unit configured to designate a nozzle group including the determined target nozzle having an assumed ejection failure, wherein the swirl determination includes causing the control unit to drive each of nozzles in the nozzle group, and wherein in a case where the swirl determination unit determines that swirl is present in the nozzle group, (1) the adjustment unit performs the adjustment of the ejection interval between the nozzles in the nozzle group, and (2) the control unit performs control to subject each of the nozzles in the nozzle group to detection of the liquid droplet again by using the sensor.

2. The printing apparatus according to claim 1, further comprising:

a carriage configured to reciprocate the print head in a main scanning direction, wherein the swirl determination unit generates a graph showing a relation between a position of the carriage and number of the nozzles by plotting a counted value of the number of nozzles, from which the sensor detects the liquid droplet in a case where the control unit drives each of the nozzles in an inspection area set to include the nozzle group, and wherein the swirl determination is carried out by comparing the generated graph with a reference graph.

3. The printing apparatus according to claim 1, wherein the control unit is enabled to eject the liquid droplet from each of the plurality of nozzles at a desired timing by using an ejection signal.

4. The printing apparatus according to claim 1, wherein the sensor includes:

a light emitting element; and a light receiving element configured to receive a light flux emitted from the light emitting element, and wherein the liquid droplet ejected from the print head blocks the light flux.

5. The printing apparatus according to claim 1, wherein the print head includes a row of nozzles including the plurality of nozzles arranged in a predetermined direction, and wherein the print head includes a plurality of the rows of nozzles.

6. The printing apparatus according to claim 5, further comprising:

a transportation unit configured to transport the print medium in a direction of transportation, wherein the predetermined direction is the direction of transportation.

7. The printing apparatus according to claim 6, wherein the direction of transportation is a direction orthogonal to a main scanning direction.

8. The printing apparatus according to claim 1, wherein the nozzle group includes:

a first nozzle determined by the assumed ejection failure determination unit to have an assumed ejection failure; and a second nozzle in a row of nozzles to which the first nozzle belongs.

9. The printing apparatus according to claim 1, wherein the nozzle group includes nozzles located at anteroposterior positions adjacently to a nozzle determined by the assumed ejection failure determination unit to have an assumed ejection failure.

10. The printing apparatus according to claim 1, wherein the swirl determination unit performs the swirl determination regarding all of the nozzles included in the print head.

11. The printing apparatus according to claim 10, wherein the ejection interval to be set to a nozzle where the swirl determination unit has determined that the swirl is present is longer than the ejection interval to be set to a nozzle where the swirl determination unit has determined that the swirl is not present.

12. A method of controlling a printing apparatus, the printing apparatus including (1) a print head including a plurality of nozzles each configured to eject a liquid droplet to a print medium, (2) a control unit configured to control drive of each of the plurality of nozzles so as to eject the liquid droplet, and (3) a sensor configured to detect the liquid droplet ejected from each of the plurality of nozzles, the method comprising the steps of:

performing a swirl determination as to whether or not there is present a swirl of the liquid droplet due to a variation or turbulence of a surrounding airflow in a case where a nozzle of the plurality of nozzles is driven by the control unit;

performing adjustment of an ejection interval between nozzles in a case of detecting the liquid droplet by using the sensor, the adjustment being carried out based on the swirl determination;

determining one of the plurality of nozzles driven by the control unit as a target nozzle having an assumed ejection failure in a case where the sensor fails to detect the liquid droplet from the nozzle; and designating a nozzle group including the determined target nozzle having an assumed ejection failure, wherein the swirl determination includes causing the control unit to drive each of nozzles in the nozzle group, and wherein in a case where the swirl determination is that swirl is present in the nozzle group, (1) the performing adjustment adjusts the ejection interval between the nozzles in the nozzle group, and (2) each of the nozzles in the nozzle group is subjected to detection of the liquid droplet again by using the sensor.

13. A non-transitory computer-readable storage medium storing a program to cause a computer to execute a method of controlling a printing apparatus, the printing apparatus including (1) a print head including a plurality of nozzles each configured to eject a liquid droplet to a print medium, (2) a control unit configured to control drive of each of the plurality of nozzles so as to eject the liquid droplet, and (3) a sensor configured to detect the liquid droplet ejected from each of the plurality of nozzles, the method comprising the steps of:

performing a swirl determination as to whether or not there is present a swirl of the liquid droplet due to a variation or turbulence of a surrounding airflow in a case where a nozzle of the plurality of nozzles is driven by the control unit;

performing adjustment of an ejection interval between nozzles in a case of detecting the liquid droplet by using the sensor, the adjustment being carried out based on the swirl determination;

determining one of the plurality of nozzles driven by the control unit as a target nozzle having an assumed ejection failure in a case where the sensor fails to detect the liquid droplet from the nozzle; and designating a nozzle group including the determined target nozzle having an assumed ejection failure, wherein the swirl determination includes causing the control unit to drive each of nozzles in the nozzle group, and wherein in a case where the swirl determination is that swirl is present in the nozzle group, (1) the performing adjustment adjusts the ejection interval between the nozzles in the nozzle group, and (2) each of the nozzles in the nozzle group is subjected to detection of the liquid droplet again by using the sensor.

* * * * *